US007018425B1

(12) United States Patent
Callaway et al.

(10) Patent No.: US 7,018,425 B1
(45) Date of Patent: Mar. 28, 2006

(54) WARP SIZE LUBRICANTS AND PROCESSES OF MAKING AND USING THE SAME

(75) Inventors: Kenneth H. Callaway, Hamilton, GA (US); Anthony N. Upchurch, Lawrenceville, GA (US); Ernest Wright, Sylacauga, AL (US)

(73) Assignee: Calgati Chemical Company, Newnan, GA (US)

( * ) Notice: Subject to any disclaimer, the term of this patent is extended or adjusted under 35 U.S.C. 154(b) by 34 days.

(21) Appl. No.: 10/287,421

(22) Filed: Nov. 4, 2002
(Under 37 CFR 1.47)

Related U.S. Application Data

(60) Provisional application No. 60/338,308, filed on Nov. 2, 2001.

(51) Int. Cl.

| | |
|---|---|
| ***D01C 3/02*** | (2006.01) |
| ***B01D 5/00*** | (2006.01) |
| ***D06M 13/10*** | (2006.01) |

(52) U.S. Cl. ............................ 8/138; 8/141; 252/8.83; 252/8.84

(58) Field of Classification Search ................ 428/245; 8/115.6, 138, 141; 252/8.83–8.84
See application file for complete search history.

(56) References Cited

U.S. PATENT DOCUMENTS

| | | | | |
|---|---|---|---|---|
| 4,106,900 | A * | 8/1978 | Perkins | 8/115.6 |
| 4,137,181 | A * | 1/1979 | Hawkins | 252/8.81 |
| 4,192,649 | A * | 3/1980 | Kato et al. | 8/138 |
| 4,756,714 | A * | 7/1988 | Hendrix et al. | 8/115.6 |
| 5,707,720 | A * | 1/1998 | Fox | 442/108 |

* cited by examiner

*Primary Examiner*—Margaret Einsmann
*Assistant Examiner*—Preeti Kumar
(74) *Attorney, Agent, or Firm*—Withers & Keys, LLC

(57) ABSTRACT

Warp size lubricants are disclosed. Processes of making and using the warp size lubricants are also disclosed. Methods of reclaiming one or more components of a warp sizing composition are also disclosed.

24 Claims, No Drawings

WARP SIZE LUBRICANTS AND PROCESSES OF MAKING AND USING THE SAME

CROSS-REFERENCE TO RELATED APPLICATIONS

The present invention claims the benefit of priority to U.S. provisional patent application 60/338,308 filed on Nov. 2, 2001.

FIELD OF THE INVENTION

The present invention relates to surfactant-lubricant compositions and processes of making the same. In particular, the present invention relates to warp size compositions for use in lubricating textile substrates.

BACKGROUND OF THE INVENTION

Warp size lubricants can be used to improve weaving performance without detriment to subsequent processing. Sizing lubricants are purported to improve properties of the sizing film produced. They are believed to help produce a smoother size film, a slicker film, enhance the flexibility or folding endurance of the film, and facilitate greater film elongation. At the same time, they are believed to have no detrimental effect on the adhesion of the sizing agent to the warp yarn. Sizing lubricants are also alleged to improve weaving performance by reducing yarn breaks by reducing the coefficient of friction between adjacent yarns and between yarns and machinery parts, while also improving the abrasion resistance of the sized yarn. Likewise, sizing lubricants are believed to reduce wear on machinery parts. Subsequent processes such as preparation (desizing, scouring, bleaching), dyeing, printing, and finishing should be either unaffected by the sizing lubricant or effected in a positive manner.

Presently, virtually all textile warp size lubricants are made from mixtures of tallow, vegetable and mineral oil, and/or paraffin wax. These materials are available in solid (powder, granules, beads, flakes) or liquid form. Flake form is most common. These traditional lubricants, or perhaps better described as softeners, are insoluble or dispersible in water.

The actual effects of traditional lubricants are in many cases opposite to the theoretical effects. Traditional lubricants may also produce other unexpected negative effects.

For examples, traditional warp size lubricants may not improve size film characteristics as expected. In contrast, these lubricants may soften the size film, make the size film grainy rather than smooth or slick, and significantly weaken the size film. Furthermore, traditional size lubricants may hinder film formation. These lubricants can also create unexpected effects. These effects include a significant reduction in foaming of the sizing agent in the preparation vessel, storage vessel, and size box as well as a minimization of sticking of the size to the drying cylinders (even when the dry cylinders have scratches on the Teflon coating). However, these effects can be accomplished more effectively by the use of other chemicals. Specially formulated anti-foams and defoamers are more cost and performance effective than traditional lubricants. Likewise, formulated anti-sticking additives are better performers compared to traditional lubricants when such a property is needed.

In many instances, the effects of traditional sizing lubricants in weaving are contrary to the theoretical effects. Most of the products used as traditional lubricants may not reduce the coefficient of friction between adjacent yarns or between yarns and machinery parts. Most commonly, the opposite is true. An increase in the coefficient of friction is normally observed. There is no improvement in abrasion resistance. In nearly every instance, there is a significant decrease in abrasion resistance. Of greatest significance, there is no reduction in yarn breaks when using traditional lubricants that is attributable to the sizing lubricant. Statistics show there to be an increase in the number of yarn breaks.

The traditional lubricants in preparation and subsequent processing are not easy to make water-soluble. These lubricants require high water temperatures, larger quantities of water, and the use of chemicals for thorough preparation (desize, scour, bleach). Furthermore, these lubricants have a well-documented history of creating dyeing, printing, and finishing faults. These faults include streaks, dye resist spots, and poor absorbency.

Thus, there is a need to develop a new type of sizing lubricant that overcomes the disadvantages of traditional sizing lubricants and can provide better performance.

SUMMARY OF THE INVENTION

The present invention is directed to a surfactant lubricant composition comprising: (a) at least one polyoxyethylated laurate surfactant, and (b) at least one polyoxyethylated castor oil surfactant. The present invention is further directed to a surfactant lubricant composition comprising: (a) at least one polyoxyethylated laurate surfactant, and (b) at least one is triglyceride and phospho-and-glyco lipid and polyoxyethylated alkyl phenols compound. Moreover, the present invention relates to a surfactant lubricant composition comprising: (a) at least one polyoxyethylated castor oil surfactant, and (b) at least one triglyceride and phospho-and-glyco lipid and polyoxyethylated alkyl phenols compound.

The present invention also is directed to a surfactant composition comprising: an effective amount of a primary lubricant, and an effective amount of a secondary lubricant. In one embodiment, the primary lubricant includes a water-soluble surfactant such as a polyoxyethylated castor oil surfactant, and the secondary lubricant includes a hydrophilic surfactant such as a polyoxyethylated laurate surfactant.

The present invention also is directed to a composition comprising: a primary lubricant, a secondary lubricant, a dispersant, a defoamer, a micro biocide and a base solution. In one embodiment, the primary lubricant includes at least one polyoxyethylated castor oil surfactant selected from the group of polyoxyethylated (36) castor oil surfactant, polyoxyethylated (40) castor oil surfactant, polyoxyethylated (81) castor oil surfactant, polyoxyethylated (200) castor oil surfactant and other polyoxyethylated castor oil surfactants with similar chemical characters. Moreover, the secondary lubricant includes at least one polyoxyethylated laurate surfactant selected from the group of polyoxyethylated laurate (5) surfactant, polyoxyethylated laurate (9) surfactant and polyoxyethylated laurate (14) surfactant and other polyoxyethylated laurate (5) surfactants with similar chemical characters. The dispersant includes at least one compound selected from triglyceride and phospho-and-glyco lipids, polyoxyethylated alkyl phenols compound, triglyceride and phospho-and-glyco lipids, and other compounds with similar chemical characters. The defoamer includes at least one compound selected from the group of copolymer of polyol and silanol. The defoamer can also be a silanol-based defoamer or mineral oil-based defoamer. The microbiocide includes at least one compound selected from the group of 1,2-benzisothiazolin-3-one, 1,3-dihydroxymethyl-5,5-dimethylhydantoin, hydroxymethyl-5,5-dimethylhydantoin, formaldehyde, and other compounds with similar chemical characters. The base solution includes a liquid such as water.

In another embodiment, the primary lubricant includes an effective amount of polyoxyethylated (40) castor oil surfactant in the range of about 10 to about 20 parts by weight (pbw), the secondary lubricant includes an effective amount of polyoxyethylated laurate (9) surfactant in the range of about 1.0 to about 10 pbw, the dispersant includes an effective amount of triglyceride and phospho-and-glyco lipids and polyoxyethylated alkyl phenols compound in the range of about 0.1 to about 5 pbw, the defoamer includes an effective amount of copolymer of polyol and silanol in the range of about 0.01 to about 1.0 pbw, the microbiocide includes an effective amount of 1,2-benzisothiazolin-3-one in the range of about 0.02 to about 1.0 pbw, and the base solution includes an effective amount of water in the range of about 65 to about 85 pbw, wherein all parts by weight are based on a total weight of the surfactant composition.

In yet another embodiment, the primary lubricant includes an effective amount of polyoxyethylated (40) castor oil surfactant of about 13.07 pbw, the secondary lubricant includes an effective amount of polyoxyethylated laurate (9) surfactant of about 6.53 pbw, the dispersant includes an effective amount of triglyceride and phospho-and-glyco lipids and polyoxyethylated alkyl phenols compound of about 0.4 pbw, the defoamer includes an effective amount of copolymer of polyol and silanol of about 0.10 pbw, the microbiocide includes an effective amount of 1,2-benzisothiazolin-3-one of about 0.021 pbw, and the base solution includes an effective amount of water of about 79.69 pbw, wherein all parts by weight are based on a total weight of the surfactant, composition.

The present invention is further directed to a process for producing a surfactant composition, comprising the steps of mixing a primary lubricant, a secondary lubricant, a dispersant, a defoamer, and a microbiocide into a first mixture, placing a base solution into the first mixture, and mixing the base solution and the first mixture to generate the surfactant composition.

In yet another aspect, the present invention provides a new composition that utilizes the surfactant composition of the present invention and a process of making the same.

Additional advantages of the invention will be set forth in part in the description which follows, and in part will be obvious from the description, or may be learned by practice of the present invention. The advantages of the present invention will be realized and attained by means of the elements and combinations particularly disclosed in the whole application. It is to be understood that both the foregoing general description and the following detailed description are exemplary and explanatory only and are not restrictive of the present invention.

DETAILED DESCRIPTION OF THE INVENTION

To promote an understanding of the principles of the present invention, descriptions of specific embodiments of the present invention follow and specific language is used to describe the specific embodiments. It will nevertheless be understood that no limitation of the scope of the present invention is intended by the use of specific language. Alterations, further modifications, and such further applications of the principles of the present invention discussed are contemplated as would normally occur to one ordinarily skilled in the art to which the invention pertains.

The present invention may be understood more readily by reference to the following detailed description of preferred embodiments of the present invention and the Examples included therein.

Before the present compounds, compositions, articles, devices, and/or methods are disclosed and described, it is to be understood that the present invention is not limited to specific synthetic methods, as such may, of course, vary. It is also to be understood that the terminology used herein is for the purpose of describing particular embodiments only and is not intended to be limiting.

As used in the specification and the appended claims, the singular forms "a," "an" and "the" include plural referents unless the context clearly dictates otherwise. Thus, for example, reference to "an acyl" includes mixtures of acyl groups, reference to "a halogen" includes mixtures of two or more such halogens, and the like.

Ranges may be expressed herein as from "about" one particular value, and/or to "about" another particular value. When such a range is expressed, the embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

In the present invention, reference will be made to a number of terms that shall be defined to have the following meanings:

References in the present invention to parts by weight, of a particular element or component in a composition or an article, denotes the weight relationship between the element or component and any other elements or components in the composition or article for which a part by weight is expressed. Thus, in a compound containing 2 parts by weight of component X and 5 parts by weight of component Y, X and Y are present at a weight ratio of 2:5, and are present in such ratio regardless of whether additional components are contained in the compound.

A weight percent of a component, unless specifically stated to the contrary, is based on the total weight of the formulation or composition in which the component is included.

By the term "effective amount" of a compound or property as provided herein it is meant such amount as is capable of performing the function of the compound or property for which an effective amount is expressed. The exact amount required will vary from process to process, or application from application, depending on recognized variables such as the compounds employed and the processing conditions observed. Thus, it is not possible to specify an exact "effective amount." However, an appropriate effective amount may be determined by one of ordinary skill in the art using only routine experimentation.

Surfactants can be used to modify many properties because of their ability to alter interfacial surface tension. Specifically, surfactants can enhance film smoothness, increase water solubility, increase yarn wetting speed, improve the depth of yarn bundle size penetration, and reduce coefficient of friction.

In the present invention, surfactants may be used in a sizing process to eliminate or minimize size skinning or filming in the size pad bath, eliminate or minimize the formation of hard size in the size pad, and minimize the development of roll marks resulting from stopping the slasher. Surfactants may also be utilized in sizing to speed the wetting of the yarn in the size pad, increase the depth of penetration of the size into the yarn, and enhance the uniformity of size pick up onto the yarn. In the weaving process, surfactants will not build up on machinery parts and therefore there will be no sticky deposits for loose fibers to adhere. This may greatly minimize clean up requirements.

Desize and scour formulae usually incorporate surfactants. The use of these surfactants is to facilitate faster and more efficient removal of natural oils, fats, and sizes applied in sizing. Surfactants applied during sizing perform similarly. Therefore, the use of surfactants in sizing is postulated to minimize the need for high water temperatures and excessive quantities of water.

Subsequent processes such as dyeing, printing, and finishing will experience no adverse effects from the use of surfactant lubricants. Typical problems of dye resist spots associated with high melt point wax may be avoided.

As used herein, the term "surfactant lubricant" refers to a compound having both a hydrophilic and hydrophobic nature such that the compound will molecularly orient itself in such a manner during a sizing process so that the hydrophilic end integrates into the film-forming materials attached to a yarn, such as during a sizing process, and the hydrophobic end or fatty portion is exposed to function as a lubricant between the size compound and other surfaces, such as weave machine components.

The present invention is directed to surfactant lubricant compositions for use as a sizing lubricant. The surfactant lubricant compositions can be used in various textile yarn lubrication applications. In one aspect, the surfactant lubricant is a liquid blend of water-soluble, surface-active agents that can be used as performance additives to replace wax and/or mineral oil based materials for the lubrication of yarns. In particular, the surfactant lubricant can be used for sizing reclamation application because the surfactant lubricant of the present invention has a high reclaim rate (about 95%).

The surfactant lubricant compositions of the present invention may comprise one or more of the following components described below.

I. Liquid Surfactant Lubricant Composition Components

The surfactant lubricant composition of the present invention comprises an effective amount of a primary lubricant, and an effective amount of a secondary lubricant that is different from the primary lubricant. The compositions of the present invention additionally may contain a dispersant, a defoamer, a microbiocide and a base solvent, such as water. Compositions of the present invention contain these components in amounts to be effective as surfactant lubricant compositions useful for textile yarn lubrication applications.

A. Water

The liquid surfactant lubricant compositions of the present invention comprise water as a primary solvent or carrier. Soft or hard water may be used in the present invention, although soft water is more desirable. As used herein, the term "soft water" refers to water containing less than about 60 ppm of calcium carbonate. As used herein, the term "hard water" refers to water containing more than about 60 ppm of calcium carbonate, while "very hard water" refers to water containing more than about 180 ppm of calcium carbonate. The liquid surfactant lubricant compositions of the present invention may be formed using water available from any municipal water-treatment facility.

The liquid surfactant lubricant compositions of the present invention typically comprise up to about 95 parts by weight (pbw) water based on a total weight of the composition. Desirably, the liquid surfactant lubricant compositions of the present invention comprise from about 50 to about 95 pbw water, more desirably, from about 65 to about 85 pbw water, based on a total weight of the composition. In one desired embodiment of the present invention, the liquid surfactant lubricant composition comprises about 80 pbw water, based on a total weight of the surfactant lubricant composition.

B. Primary Lubricant

The liquid surfactant lubricant compositions of the present invention comprise at least one primary lubricant. Desirably, the at least one primary lubricant is a water-soluble surfactant. It is believed that the at least one primary lubricant may also function as a softener and/or emulsifier in the surfactant lubricant compositions of the present invention. Suitable primary lubricants include, but are not limited to, polyoxyethylated castor oil surfactants, such as polyoxyethylated (36) castor oil surfactant, polyoxyethylated (40) castor oil surfactant, polyoxyethylated (81) castor oil surfactant, polyoxyethylated (200) castor oil surfactant, and any other polyoxyethylated castor oil surfactant having similar chemical characteristics.

The one or more primary lubricants may be present in the liquid surfactant lubricant compositions of the present invention in an amount up to about 30 parts by weight (pbw) based on a total weight of the composition. Desirably, the one or more primary lubricants are present in the liquid surfactant lubricant composition in an amount ranging from about 2.0 pbw to about 25 pbw, more desirably, from about 10.0 pbw to about 20 pbw, based on a total weight of the composition. In one desired embodiment of the present invention, the liquid surfactant lubricant composition comprises 13.0 pbw of one or more primary lubricants, based on a total weight of the composition.

A number of primary lubricants suitable for use in the present invention are commercially available from a variety of suppliers. Suitable commercially available primary lubricants include, but are not limited to, polyoxyethylated castor oil surfactants sold under the trade designations ETHOX CO-36 (i.e., polyoxyethylated (36) castor oil surfactant), ETHOX CO-40 (i.e., polyoxyethylated (40) castor oil surfactant), and ETHOX CO-81 (i.e., polyoxyethylated (81) castor oil surfactant), all of which are available from Ethox Chemicals, LLC (Greenville, S.C.). Desirably, the surfactant lubricant compositions of the present invention comprise a polyoxyethylated (40) castor oil surfactant available from Ethox Chemicals, LLC (Greenville, S.C.), and sold under the trade designation ETHOX CO-40.

C. Secondary Lubricant

The liquid surfactant lubricant compositions of the present invention also comprise at least one secondary lubricant. Desirably, the at least one secondary lubricant is a hydrophilic surfactant. It is believed that the at least one secondary lubricant may also function as a leveling agent, an emulsifier and/or a coupling agent in the surfactant lubricant compositions of the present invention. Suitable secondary lubricants include, but are not limited to, polyoxyethylated laurate surfactants, such as polyoxyethylated laurate (5) surfactant, polyoxyethylated laurate (9) surfactant, polyoxyethylated laurate (14) surfactant, and any other polyoxyethylated laurate surfactant having similar chemical characteristics.

The one or more secondary lubricants may be present in the liquid surfactant lubricant compositions of the present invention in an amount up to about 50 parts by weight (pbw) based on a total weight of the composition. Desirably, the one or more secondary lubricants are present in the liquid surfactant lubricant composition in an amount ranging from about 0.5 pbw to about 20 pbw, more desirably, from about 1.0 pbw to about 10 pbw, based on a total weight of the composition. In one desired embodiment of the present invention, the liquid surfactant lubricant composition comprises about 6.5 pbw of one or more secondary lubricants, based on a total weight of the composition.

A number of secondary lubricants suitable for use in the present invention are commercially available from a variety of suppliers. Suitable commercially available secondary lubricants include, but are not limited to, polyoxyethylated laurate surfactants sold under the trade designations ETHOX ML-5 (i.e., polyoxyethylated laurate (5) surfactant), ETHOX ML-9 (i.e., polyoxyethylated laurate (9) surfactant), and ETHOX ML-14 (i.e., polyoxyethylated laurate (14) surfactant), all of which are available from Ethox Chemicals, LLC (Greenville, S.C.). Desirably, the surfactant lubricant compositions of the present invention comprise a polyoxyethylated laurate (9) surfactant available from Ethox Chemicals, LLC (Greenville, S.C.), and sold under the trade designation ETHOX ML-9.

D. Dispersant

The liquid surfactant lubricant compositions of the present invention may optionally comprise at least one dispersant. Suitable dispersants include, but are not limited to, triglycerides, phospholipids, glycolipids, phosphoglycolipids, polyoxyethylated alkyl phenol compounds having up to about 20 carbon atoms, and other compounds having similar chemical characteristics. It is believed that one or more of the above-described dispersants may act together to lend anti-stick properties to the liquid surfactant lubricant compositions of the present invention. It is further believed that the polyoxyethylated alkyl phenol may function as a solvent for the phospholipids, glycolipids, or a combination thereof.

The one or more dispersants may be present in the surfactant lubricant compositions of the present invention in an amount up to about 5.0 parts by weight (pbw) based on a total weight of the composition. Desirably, the one or more dispersants are present in the surfactant lubricant composition in an amount ranging from about 0.01 pbw to about 2.0 pbw, more desirably, from about 0.1 pbw to about 1.0 pbw, based on a total weight of the composition. In one desired embodiment of the present invention, the surfactant lubricant composition comprises about 1.0 pbw of one or more dispersants, based on a total weight of the composition.

A number of dispersants suitable for use in the present invention are commercially available from a variety of suppliers. Suitable commercially available dispersants include, but are not limited to, dispersants sold under the trade designations LECIWET™ WD 120(3-39), available from Lucas Meyer, Inc. (Decatur, Ill.). LECIWET™ WD 120(3-39) comprises a composition containing one or more nonpolar lipids (i.e, triglycerides), one or more polar lipids (i.e, phospho- and gluco-lipids), and polyoxyethylated alkyl phenols having up to about 20 carbon atoms.

E. Defoamer

The liquid surfactant lubricant compositions of the present invention may also optionally comprise at least one defoamer. Suitable defoamers include, but are not limited to, foam control agents containing one or more components selected from hydrophobic silica, ethylene oxide/propylene oxide copolymer, silanols derived from silanes, and copolymers of polyol and silanol; silanol-based defoamers, and mineral oil-based defoamers.

The one or more defoamers may be present in the liquid surfactant lubricant compositions of the present invention in an effective amount to control foaming of the composition. Typically, when present, one or more defoamers are present in the liquid surfactant lubricant compositions of the present invention in an amount up to about 1.0 pbw based on a total weight of the composition. Desirably, the one or more defoamers, when present, are present in the surfactant lubricant composition in an amount ranging from about 0.01 pbw to about 1.0 pbw, more desirably, from about 0.05 pbw to about 0.2 pbw, based on a total weight of the composition. In one desired embodiment of the present invention, the surfactant lubricant composition comprises about 0.1 pbw of one or more defoamers, based on a total weight of the composition.

A number of defoamers suitable for use in the present invention are commercially available from a variety of suppliers. Suitable commercially available defoamers include, but are not limited to, foam control agents sold under the trade designation FOAM BLAST®, available from Ross Chemical Company (Fountain Inn, S.C.), such as FOAM BLAST® 337 and FOAM BLAST® 552; foam control agents available from Harcross Chemicals (Kansas City, Mo.), such as Harcross Silicone AF-10 FG; foam control agents available from Dow Corning Corp. (Midland, Mich.), such as Dow Corning 1510 Silicone; and foam control agents sold under the trade designation FLUOWET®, available from Clariant Corp. (Charlotte, N.C.), such as FLUOWET® PL-80.

In one desired embodiment of the present invention, the surfactant lubricant composition contains up to about 1.0 pbw of FOAM BLAST® 552 based on a total weight of the surfactant lubricant composition. FOAM BLAST® 552 is a proprietary mixture containing hydrophobic silica, ethylene oxide/propylene oxide copolymer, silanols derived from silanes, and small amounts of nonionic surfactants. FOAM BLAST® 552 is one example of a defoamer referred to herein as containing copolymers of polyol and silanol.

F. Microbiocide

The liquid surfactant lubricant compositions of the present invention may further optionally comprise at least one microbiocide. Suitable microbiocides include, but are not limited to, 1,2-benzisothiazolin-3-one, 1,3-dihydroxymethyl-5,5-dimethylhydantoin, hydroxymethyl-5,5-dimethylhydantoin, formaldehyde, and other compounds having similar chemical characteristics.

The one or more microbiocides may be present in the liquid surfactant lubricant compositions of the present invention in an effective amount to control microbial growth in the composition during processing, packaging and storage. Typically, when present, one or more microbiocides are present in the liquid surfactant lubricant compositions of the present invention in an amount up to about 1.0 pbw based on a total weight of the composition. Desirably, the one or more microbiocides, when present, are present in the liquid surfactant lubricant composition in an amount ranging from about 0.01 pbw to about 1.0 pbw, more desirably, from about 0.05 pbw to about 0.3 pbw, based on a total weight of the composition. In one desired embodiment of the present invention, the liquid surfactant lubricant composition comprises about 0.21 pbw of one or more microbiocides, based on a total weight of the composition.

A number of microbiocides suitable for use in the present invention are commercially available from a variety of suppliers. Suitable commercially available microbiocides include, but are not limited to, microbiocides sold under the trade designation NIPACIDE® BIT-20, available from Clariant Corp. (Charlotte, N.C.). NIPACIDE® BIT-20 is an aqueous solution of 1,2-benzisothiazolin-3-one and propylene glycol.

G. Additives

The liquid surfactant lubricant compositions of the present invention may further optionally comprise one or more additives as described below.

a. Starch or Starch Derivatives

In one embodiment of the present invention, the liquid surfactant lubricant compositions further comprise a starch or starch derivative. Suitable starches or starch derivatives for use in the present invention include, but are not limited to, natural starches, such as corn starch, potato starch, and yucca starch, and synthetic starches, such as chemically modified starches. Starches may be acid modified, ethoxylated or oxidized.

One or more starches or starch derivatives may be added to the liquid surfactant lubricant compositions in an amount of up to about 50 pbw, based on a total weight of the liquid surfactant lubricant compositions. Desirably, the one or more starches or starch derivatives, when present, are present in the liquid surfactant lubricant compositions in an amount ranging from about 10.0 pbw to about 30.0 pbw, based on a total weight of the liquid surfactant lubricant compositions.

b. Film-Forming Agents

The liquid surfactant lubricant compositions may also comprise one or more film-forming agents. Suitable film-forming agents for use in the present invention include, but are not limited to, acrylamide homopolymer, polyvinyl alcohol, carboxymethylcellulose (CMC), polyvinylacetate, guar gum, acrylic polymers, polyester resins, or a combination thereof. Desirably, the film-forming agent comprises a non-ionic water-soluble acrylamide homopolymer or a low viscosity, partially hydrolized polyvinyl alcohol.

One or more film-forming agents may be added to the liquid surfactant lubricant compositions in an amount of up to about 20.0 pbw, based on a total weight of the liquid surfactant lubricant compositions. Desirably, the one or more film-forming agents, when present, are present in the liquid surfactant lubricant compositions in an amount ranging from about 1.0 pbw to about 5.0 pbw, based on a total weight of the liquid surfactant lubricant composition.

c. Inorganic and Organic Salts

The liquid surfactant lubricant compositions may further comprise one or more inorganic or organic salts. Suitable inorganic salts for use in the present invention include, but are not limited to, sodium chloride, sodium carbonate, and sodium silicate. Suitable organic salts for use in the present invention include, but are not limited to, cationic polyamines. Desirably, when present, the liquid surfactant lubricant composition comprises an inorganic salt in the form of sodium chloride.

One or more inorganic or organic salts may be added to the liquid surfactant lubricant composition in an amount of up to about 5.0 pbw, based on a total weight of the liquid surfactant lubricant composition. Desirably, the one or more inorganic or organic salts, when present, are present in the liquid surfactant lubricant composition in an amount ranging from about 1.0 pbw to about 3.0 pbw, based on a total weight of the liquid surfactant lubricant composition.

II. Specific Liquid Surfactant Lubricant Compositions

In one embodiment of the present invention, the liquid surfactant lubricant composition comprises water, at least one primary lubricant, at least one secondary lubricant, at least one dispersant, at least one defoamer, and at least one microbiocide. Desirably, the at least one primary lubricant comprises polyoxyethylated (36) castor oil surfactant, polyoxyethylated (40) castor oil surfactant, polyoxyethylated (81) castor oil surfactant, polyoxyethylated (200) castor oil surfactant, or a combination thereof; the at least one secondary lubricant comprises polyoxyethylated laurate (5) surfactant, polyoxyethylated laurate (9) surfactant and polyoxyethylated laurate (14) surfactant, or a combination thereof, the at least one dispersant comprises a triglyceride, a phospholipid, a glycolipid, a polyoxyethylated alkyl phenol wherein the alkyl group has up to about 20 carbon atoms therein, or a combination thereof; the at least one defoamer comprises a copolymer of polyol and silanol; and the at least one microbiocide comprises 1,2-benzisothiazolin-3-one, 1,3-dihydroxymethyl-5,5-dimethylhydantoin, hydroxymethyl-5,5-dimethylhydantoin, formaldehyde, or a combination thereof.

In a further embodiment of the present invention, the liquid surfactant lubricant composition comprises water in an amount ranging from about 65 to about 85 pbw, polyoxyethylated (40) castor oil surfactant in an amount ranging from about 10 to about 20 pbw, and polyoxyethylated laurate (9) surfactant in an amount ranging from about 1.0 to about 10 pbw, wherein all parts by weight are based on a total weight of the liquid surfactant composition. The liquid surfactant lubricant composition may further comprise a dispersant in an amount ranging from about 0.1 to about 5.0 pbw, a defoamer in an amount ranging from about 0.01 to about 1.0 pbw, and a microbiocide in an amount ranging from about 0.02 to about 1.0 pbw, wherein all parts by weight are based on a total weight of the liquid surfactant composition.

In yet a further embodiment of the present invention, the liquid surfactant lubricant composition consists essentially of water in an amount ranging from about 65 to about 85 pbw; polyoxyethylated (40) castor oil surfactant in an amount ranging from about 10 to about 20 pbw, and polyoxyethylated laurate (9) surfactant in an amount ranging from about 1.0 to about 10 pbw; a dispersant, such as LECIWET™ WD 120(3-39), in an amount ranging from about 0.1 to about 5.0 pbw; a defoamer, such as FOAM BLAST® 552, in an amount ranging from about 0.01 to about 1.0 pbw; and a microbiocide, such as NIPACIDE® BIT-20, in an amount ranging from about 0.02 to about 1.0 pbw, wherein all parts by weight are based on a total weight of the liquid surfactant composition.

In other embodiments of the present invention, the liquid surfactant lubricant composition comprises water in an amount ranging from about 65 to about 85 pbw; polyoxyethylated (40) castor oil surfactant in an amount ranging from about 10 to about 20 pbw; polyoxyethylated laurate (9) surfactant in an amount ranging from about 1.0 to about 10 pbw; and at least one starch, starch derivative or film-forming agent in an amount ranging from about 5.0 to about 70 pbw; wherein all parts by weight are based on a total weight of the liquid surfactant composition. In this embodiment, the liquid surfactant lubricant composition may further comprise a dispersant in the range of about 0.1 to about 5.0 pbw, a defoamer in the range of about 0.01 to about 1.0 pbw, a microbiocide in the range of about 0.02 to about 1.0 pbw, wherein all parts by weight are based on a total weight of the liquid surfactant composition.

In other embodiments of the present invention, the liquid surfactant lubricant composition consists essentially of water in an amount ranging from about 65 to about 85 pbw; polyoxyethylated (40) castor oil surfactant in an amount ranging from about 10 to about 20 pbw; polyoxyethylated laurate (9) surfactant in an amount ranging from about 1.0 to about 10 pbw; at least one starch or starch derivative in an amount of up to about 50 pbw; and at least one film-forming agent in an amount ranging from about 5.0 to about 20 pbw; wherein all parts by weight are based on a total weight of the liquid surfactant composition. The liquid surfactant lubricant composition may comprise the above-mentioned components and further consist essentially of a dispersant in an amount ranging from about 0.1 to about 5.0 pbw, a defoamer in an amount ranging from about 0.01 to about 1.0 pbw, and a microbiocide in an amount ranging from about 0.02 to about 1.0 pbw, wherein all parts by weight are based on a total weight of the liquid surfactant composition.

III. Dry Surfactant Lubricant Compositions

The surfactant lubricant compositions of the present invention may also be in dry, powder or particulate form, wherein water is removed from any of the above-described compositions. Water may be removed from the above-described liquid surfactant lubricant compositions by any method known in the art. Typically, water is removed by exposing any of the above-described liquid surfactant lubricant compositions to heat for a desired length of time, and then optionally removing additional moisture using a desiccator or similar apparatus.

In one embodiment of the present invention, the dry surfactant lubricant composition comprises at least one primary lubricant, at least one secondary lubricant, and at least one film-forming agent. The dry surfactant lubricant composition may further comprise at least one salt, at least one dispersant, at least one defoamer, and at least one microbiocide. Desirably, the at least one primary lubricant comprises polyoxyethylated (36) castor oil surfactant, polyoxyethylated (40) castor oil surfactant, polyoxyethylated (81) castor oil surfactant, polyoxyethylated (200) castor oil surfactant, or a combination thereof; the at least one secondary lubricant comprises polyoxyethylated laurate (5) surfactant, polyoxyethylated laurate (9) surfactant and polyoxyethylated laurate (14) surfactant, or a combination thereof; the one or more film-forming agents comprise polyvinyl alcohol, urea, starch, or a combination thereof; the at least one dispersant comprises a triglyceride, a phospholipid, a glycolipid, a polyoxyethylated alkyl phenol wherein the alkyl group has up to about 20 carbon atoms therein, or a combination thereof; the at least one defoamer comprises a copolymer of polyol and silanol; and the at least one microbiocide comprises 1,2-benzisothiazolin-3-one, 1,3-dihydroxymethyl-5,5-dimethylhydantoin, hydroxymethyl-5,5-dimethylhydantoin, formaldehyde, or a combination thereof.

In a further embodiment of the present invention, the dry surfactant lubricant composition comprises polyoxyethylated (40) castor oil surfactant in an amount ranging from greater than 0 to about 10 pbw; polyoxyethylated laurate (9) surfactant in an amount ranging from about greater than 0 to about 10 pbw; polyvinyl alcohol in an amount ranging from 0 to about 20 pbw; urea in an amount ranging from 0 to about 20 pbw; starch in an amount ranging from 0 to about 80 pbw, and at least one salt in an amount ranging from greater than 0 to about 20 pbw; wherein all parts by weight are based on a total weight of the dry surfactant composition. The dry surfactant lubricant composition may further comprise a dispersant in an amount ranging from greater than 0 to about 5.0 pbw, a defoamer in an amount ranging from greater than 0 to about 1.0 pbw, and a microbiocide in an amount ranging from greater than 0 to about 1.0 pbw, wherein all parts by weight are based on a total weight of the dry surfactant composition.

In yet a further embodiment of the present invention, the dry surfactant lubricant composition comprises polyoxyethylated (40) castor oil surfactant in an amount ranging from about 0.1 to about 6.0 pbw, and polyoxyethylated laurate (9) surfactant in an amount ranging from about 0.1 to about 3.0 pbw; polyvinyl alcohol in an amount ranging from about 5.0 to about 15 pbw, more desirably, about 10 pbw; urea in an amount ranging from about 5.0 to about 15 pbw, more desirably, about 10 pbw; starch in an amount ranging from about 50 to about 75 pbw, more desirably, about 65 pbw; at least one salt in an amount ranging from about 5.0 to about 20 pbw, desirably, about 10 pbw; and less than about 10 pbw of one or more components such as a wax, a dispersant, a defoamer, and a microbiocide; wherein all parts by weight are based on a total weight of the dry surfactant composition.

The dry surfactant lubricant compositions of the present invention provide an ability to introduce a single product into water to produce a warp sizing composition. Such a "one-step" process provides ease of manufacturing for the textile operator by eliminating formulation steps, numerous weighing steps (i.e., for each component), and numerous mixing steps. The dry surfactant lubricant compositions of the present invention may be used in a method of doing business, wherein a pre-formulated warp sizing composition is provided to a user such that the user only has to add water to the dry surfactant lubricant composition of the present invention.

IV. Methods of Making Surfactant Lubricant Compositions

The present invention is further directed to a method of making surfactant lubricant compositions. The surfactant lubricant compositions of the present invention may be prepared using conventional mixing techniques at room temperature. In one exemplary embodiment of the present invention, the surfactant lubricant composition is prepared using the following method steps:

Step 1: placing the following components in the following order into a vessel: at least one primary lubricant, at least one secondary lubricant, at least one dispersant, at least one defoamer, and at least one microbiocide;

Step 2: mixing the components in the vessel at a desired speed for a desired time (e.g., 40–60 rpm for about 15 minutes) to produce a first mixture;

Step 3: introducing water into the vessel while mixing; and

Step 4: mixing the first mixture and the water in the vessel at a desired speed for a desired time (e.g., 150–300 rpm for about 20 minutes) until thoroughly mixed to produce the surfactant lubricant composition.

The resulting surfactant lubricant composition may be sampled for quality assurance purposes, and then discharged from the vessel, filtered to remove any particulates, and then packaged for storage and/or distribution.

For dry surfactant lubricant compositions, a drying step may be added to the above exemplary procedure. As discussed above, any known drying process or processes may be used to remove water or other solvents from the surfactant lubricant composition.

V. Methods of Using Surfactant Lubricant Compositions

The surfactant lubricant compositions of the present invention may be used in a number of applications including, but not limited to, warp sizing, etc. The surfactant lubricant compositions of the present invention are particularly useful as warp sizing compositions. The above-described liquid surfactant lubricant compositions of the present invention may be added to a warp sizing composition along with one or more additional components as described below. When using a dry surfactant lubricant composition of the present invention, the dry surfactant lubricant composition of the present invention may simply be added to water or may be combined with one or more additional components as described below to form a final warp sizing composition.

A. Warp Sizing Compositions

1. Water

The warp sizing composition comprises water. Soft or hard water may be used, although soft water is more desirable. The warp sizing compositions of the present invention may be formed using water available from any municipal water-treatment facility.

The warp sizing compositions of the present invention typically comprise greater than about 80 parts by weight (pbw) water based on a total weight of the warp sizing composition. Desirably, the warp sizing compositions of the present invention comprise from about 90 to about 99.5 pbw water, more desirably, from about 95 to about 99 pbw water, based on a total weight of the warp sizing composition.

2. Surfactant Lubricant Composition

The warp sizing compositions of the present invention contain one or more of the above-described surfactant lubricant compositions. Typically, the warp sizing compositions of the present invention comprise up to about 5.0 pbw of one or more of the above-described surfactant lubricant compositions, based on a total weight of the of the warp sizing composition. Desirably, the warp sizing compositions of the present invention comprise from about 0.1 to about 5.0 pbw of one or more of the above-described surfactant lubricant compositions, more desirably, from about 0.5 to about 3.0 pbw, even more desirably, from about 1.0 to about 2.0 pbw, based on a total weight of the warp sizing composition.

The amount of surfactant lubricant composition present in the warp sizing composition may vary depending on a number of factors including, but not limited to, the warp components. For example, a dosage rate of about 1.8 pbw may be used for cotton yarns, while a dosage rate of about 2.1 pbw may be used for polyester/cotton blended yarns, wherein the pbw are based on a total weight of the warp sizing composition. Additionally, the warp sizing composition may be used at dosage rates in the range of about 0.10 to about 0.25 pbw when applied by a kiss roll techniques or by wicking methods, wherein the pbw are based on a total weight of the warp sizing composition.

3. Other Warp Sizing Components

Warp sizing compositions of the present invention contain water and a desired amount of a surfactant lubricant composition of the present invention as described above. The following components may be combined with water and a surfactant lubricant composition of the present invention to form a warp sizing composition of the present invention.

a. Starch or Starch Derivatives

As noted above, the surfactant lubricant composition used to form the warp sizing composition may already contain a sufficient amount of starch or starch derivative to form a warp sizing composition. However, in some embodiments, additional starch or starch derivative may be added to form a warp sizing composition of the present invention. Suitable additional starches or starch derivatives for use in the present invention include, but are not limited to, natural starches and chemically modified starches as described above.

One or more starches or starch derivatives may be added to the warp sizing composition in an amount of up to about 50 pbw, based on a total weight of the warp sizing composition. Desirably, the one or more starches or starch derivatives, when present, are present in the warp sizing composition in an amount ranging from about 10.0 pbw to about 30.0 pbw, based on a total weight of the warp sizing composition.

b. Film-Forming Agents

As noted above, the surfactant lubricant composition used to form the warp sizing composition may already contain a sufficient amount of film-forming agents to form a warp sizing composition. However, in some embodiments, additional film-forming agents may be added to form a warp sizing composition of the present invention. Suitable film-forming agents for use in the present invention include, but are not limited to, one or more of the above-described film-forming agents. Desirably, the film-forming agent comprises a non-ionic water-soluble acrylamide homopolymer, polyvinyl alcohol, CMC, guar gum, or a combination thereof.

One or more film-forming agents may be added to the warp sizing composition in an amount of up to about 20.0 pbw, based on a total weight of the warp sizing composition. Desirably, the one or more film-forming agents are present in the warp sizing composition in an amount ranging from about 1.0 pbw to about 5.0 pbw, based on a total weight of the warp sizing composition.

c. Inorganic and Organic Salts

As noted above, the surfactant lubricant composition used to form the warp sizing composition may already contain a sufficient amount of one or more salts to form a warp sizing composition. However, in some embodiments, additional salt may be added to form a warp sizing composition of the present invention. It is believed that the addition of one or more salts assists in fixing colorants, such as dyes, to a given fabric. Suitable salts for use in the present invention include the above-mentioned inorganic and organic salts. Desirably, when present, the warp sizing composition comprises an inorganic salt in the form of sodium chloride.

One or more inorganic or organic salts may be added to the warp sizing composition in an amount of up to about 5.0 pbw, based on a total weight of the warp sizing composition. Desirably, the one or more inorganic or organic salts, when present, are present in the warp sizing composition in an amount ranging from about 1.0 pbw to about 3.0 pbw, based on a total weight of the warp sizing composition.

d. Viscosity-Adjusting Agents

The warp sizing composition may further comprise one or more viscosity-adjusting agents. Suitable viscosity-adjusting agents for use in the present invention include, but are not limited to, carbonyl diamide, a polyethylene glycol, and glycerin. Desirably, when present, the warp sizing composition comprises a viscosity-adjusting agent in the form of carbonyl diamide.

One or more viscosity-adjusting agents may be added to the warp sizing composition in an amount of up to about 5.0 pbw, based on a total weight of the warp sizing composition. Desirably, the one or more viscosity-adjusting agents, when present, are present in the warp sizing composition in an amount ranging from about 1.0 pbw to about 3.0 pbw, based on a total weight of the composition.

It is believe that the viscosity-adjusting agent assists in controlling the viscosity of the resulting composition, as well as, act as a humectant and plasticizing agent.

B. Sized Warps

The above-described warp sizing compositions may be applied to a variety of warps. For example, the warp sizing compositions may be used for sizing warps comprising a plurality of yarns, wherein each yarn comprises one or more natural or synthetic fibers. Suitable warps include, but are not limited to, warps of cotton, polyester, viscose, rayon, wool, nylon and blends of any of these fibers. In one desired embodiment of the present invention, a warp sizing composition is applied to a warp of cotton or a cotton/polyester blend.

Typically, the warp sizing composition is applied to a warp to produce a sized warp having a size content of up to about 20 pbw, based on a total weight of the yarns in the warp. (It should be noted that the amount of size may also be expressed as "add-on levels up to about 20%.") Desirably, the warp sizing composition is applied to a warp to produce a sized warp having a size content of from about 1.0 to about 18 pbw, more desirably, from about 6.0 to about 14 pbw based on a total weight of the yarns in the warp.

VI. Methods of Reclaiming One or More Components from a Surfactant Lubricant Composition During a Desizing Process The present invention is further directed to a method of reclaiming one or more components from a warp sizing composition, wherein the one or more components include one or more components from the above-described surfactant lubricant composition. The above-described surfactant lubricant compositions provide a number of processing and product advantages in several areas of textile processing, particularly, in textile mills that reclaim or recycle their size material. The ability to remove size material from a woven fabric and recycle the size material results in at least the following advantages: (1) removing residual size and impurities from the woven fabric produces a "cleaner" fabric; (2) by providing a "cleaner" fabric to post-desizing processes, fabrics may be bleached and dyed with less defects resulting from the presence of residual size and impurities; (3) less size and impurities are deposited into a water waste stream; and (4) a more cost-effective process is obtained given that a portion of the size material may be reused in subsequent sizing processes.

Typically, a warp sizing composition, such as one of the above-described warp sizing compositions of the present invention, is applied to a warp via a warp slasher. After weaving, the woven fabric is desized and the desize liquor is collected and transferred to a holding tank. To desize the liquor, the liquor is passed through an ultra filtration device wherein impurities pass through the filter, but desirably size material is collected on the filter (i.e., does not pass through the filter). The reclaimed size may be returned to the slashing operation for repeated use.

Suitable ultra filtration equipment includes, but is not limited to, GTV UF cell ultra filtration equipment available from GTV (Gesellschaft fur Trenn verfahren) (Bodelshausen, Germany).

It is believed that traditional wax and wax/urea combinations are reclaimed at about 50% or less. In other words, less than about 50% of wax and/or wax/urea on a woven fabric is reclaimed during an ultra filtration process. The other 50+% of wax and/or wax/urea either (i) passes through the ultra filtration filtering system or (ii) remains on the woven fabric, which leads to the potential for dyeing defects such as blotchiness and streaks. In contrast, as much as 95% of one or more components in the above-described surfactant lubricant compositions may be reclaimed using the above-described filtration process.

In one desired embodiment of the present invention, one of the above-described surfactant lubricant compositions comprising polyoxyethylated (9) laurate and polyoxyethylated (40) castor oil is used in a warp sizing composition containing polyvinyl alcohol as a film-forming agent. After sizing and weaving, a desizing process is used to remove a portion of the warp sizing composition applied to the woven fabric. Desirably, at least 50% of each of the polyoxyethylated (9) laurate, the polyoxyethylated (40) castor oil and the polyvinyl alcohol is recovered during the reclamation process. In a further embodiment of the present invention, the above-described reclamation process recovers at least about 60% (at least about 70%, at least about 80%), more desirably at least about 90% of each of the polyoxyethylated (9) laurate, polyoxyethylated (40) castor oil and polyvinyl alcohol applied to the woven fabric. In some cases, the above-described reclamation process may be used to recover at least about 95% of each of the polyoxyethylated (9) laurate, polyoxyethylated (40) castor oil and polyvinyl alcohol applied to the woven fabric.

The present invention can be further illustrated by the following examples of various embodiments, although it should be understood that these examples are included merely for purposes of illustration and are not intended to limit the scope of the present invention unless otherwise specifically indicated. Efforts have been made to ensure accuracy with respect to numbers (e.g., amounts, temperature, etc.), but some errors and deviations should be accounted for. Unless indicated otherwise, parts are parts by weight, percent is percent by weight, temperature is in ° C. or is at ambient temperature, and pressure is at or near atmospheric pressure.

EXAMPLES

The materials shown in Table 1 are used in the examples below.

TABLE 1

Chemicals Used In Examples

| Material | Description | Manufacturer |
|---|---|---|
| ETHOX ML-9 | polyoxyethylated (9) laurate surfactant having 9 moles of ethoxylate | Ethox Corp. Greenville, SC |

TABLE 1-continued

| Chemicals Used In Examples | | |
|---|---|---|
| Material | Description | Manufacturer |
| | groups per laurate molecule | |
| ETHOX CO-40 | polyoxyethylated (40) castor oil surfactant | Ethox Corp. Greenville, SC |
| LECIWET WD 120-3-39 | triglyceride and phospho- and glyco lipids and polyoxyethylated alkyl phenols compound | Lucas-Meyer Co. Decatur, IL |
| FOAM BLAST ® 552 | copolymer of polyol and silanol | Ross Chemical Cleveland, OH |
| BIT-20 | 1,2-benzisothiazolin-3-one | Clarient Corp. Charlotte, NC |
| POVAL217 | low viscosity partially hydrolyzed polyvinyl alcohol | Kuraray Chemical Co. Osaka, Japan |
| sodium chloride | sodium chloride | North American Salt Co./Cargill Overland Park, KS |
| 46% Microprill Urea | carbonyl diamide | PCA Corp. Skokic, IL |
| Colsize WLV | acrylamide homopolymer | Ciba Chemicals Albemarle, NC |

Example 1

Preparation of a Surfactant Lubricant Composition

A surfactant lubricant composition, referred to herein as SUPERLUBE L-22 M, having the formulation as shown in Table 2 below was formed in a 1500-gallon stainless steel atmospheric mixing vessel with a center shaft mixer. The vessel was equipped with an electric, 230/460, 60 hertz, variable speed and reversible drive, AC inverter, 7.5 horsepower motor. The motor had a maximum speed of 1760 revolutions per minute (rpm). The vessel had two standard sized, 6 inch baffles. The vessel was further equipped with an axial-flow impeller, pitched-blade turbine, mounted to the bottom of the center shaft. The total batch weight was 11,000 pounds.

TABLE 2

| SUPERLUBE L-22 M Surfactant Lubricant Composition | | |
|---|---|---|
| Component | Product Name | Parts By Weight (pbw) |
| 1 | ETHOX ML-9 | 6.53 |
| 2 | ETHOX CO-40 | 13.07 |
| 3 | LECIWET WD 120-3-39 | 0.40 |
| 4 | FOAM BLAST ® 552 | 0.10 |
| 5 | BIT-20 | 0.21 |
| 6 | water | 79.69 |

The surfactant lubricant composition was produced using the following steps:

Step 1: placing components 1, 2, 3, 4, and 5 in order into the vessel;

Step 2: mixing the components in the vessel at a speed of 40–60 rpm for about 15 minutes to produce a first mixture;

Step 3: placing component 6 (water) into the vessel; and

Step 4: mixing the first mixture and the water in the vessel at a speed of 150–300 rpm for about 20 minutes until thoroughly mixed to produce the surfactant lubricant composition.

The resulting surfactant lubricant composition was packaged for storage.

Example 2

Preparation of a Surfactant Lubricant Composition

A second SUPERLUBE L-22 M surfactant lubricant composition was prepared using the equipment as described in Example 1. The second SUPERLUBE L-22 M surfactant lubricant composition had a formulation as shown in Table 3 below.

TABLE 3

| SUPERLUBE L-22 M Surfactant Lubricant Composition | | |
|---|---|---|
| Component | Product Name | Parts By Weight (pbw) |
| 1 | ETHOX ML-9 | 6.50 |
| 2 | ETHOX CO-40 | 13.11 |
| 3 | LECIWET WD 120-3-39 | 0.40 |
| 4 | FOAM BLAST ® 552 | 0.10 |
| 5 | BIT-20 | 0.20 |
| 6 | water | 79.69 |

The SUPERLUBE L-22 M surfactant lubricant composition was produced using the following steps:

Step 1: placing 6 (water) into the vessel and mixing at a speed of 150–300 rpm;

Step 2: adding components 1, 2, 3, 4, and 5 in order into the vessel while mixing; and Step 3: mix for about 20 minutes or until thoroughly mixed to produce the surfactant lubricant composition.

The resulting SUPERLUBE L-22 M product had a light amber-yellow liquid with a slight haze. The SUPERLUBE L-22 M made by this procedure was not as clear as the SUPERLUBE L-22 M of Example 1, but was a viable product with no sign of separation or layering.

It should be noted that FOAM BLAST® 552 can be added at any time, if necessary, to reduce tendency to foam during production. Also, the ML-9 and CO-40 can be switched in order.

Example 3

Preparation of a Warp Sizing Intermediate Composition and Final Composition

A warp sizing intermediate composition and final composition were prepared using the following two-stage procedure. The resultant composition of stage 1 was referred to as "DENIMFLEX Intermediate" and the resultant composition of stage 2 is referred to as "DENIMFLEX" warp sizing composition. First and second mixing vessels were used as described below.

The first mixing vessel was a 225-gallon stainless steel atmospheric mixing vessel with a center shaft. The first vessel was equipped with an electric, 230/460 volt, 60 hertz, single speed drive, 5 horsepower motor having a capacity speed of 150 rpm. The first vessel was gas fired from bottom for heating. The first vessel had no baffles. The first vessel was further equipped with 3 axial-flow impellers, pitched-blade turbine type, mounted at bottom, middle and top of center shaft.

The second mixing vessel was a 1500-gallon stainless steel atmospheric mixing vessel with a center shaft. The second vessel was equipped with an electric, 230/460, 60 hertz, variable speed and reversible drive, AC inverter, 7.5 horsepower motor. The motor had a maximum speed of 1760 rpm. The second vessel had two standard sized, 6 inch baffles. The second vessel was further equipped with an axial-flow impeller, pitched-blade turbine, mounted to the bottom of the center shaft.

The DENIMFLEX Intermediate had the following formulation as shown in Table 4 below.

TABLE 4

DENIMFLEX Intermediate Formulation

| Component | Product Name | Parts By Weight (pbw) |
|---|---|---|
| 1 | water | 72.00 |
| 2 | FOAM BLAST ® 552 | 1.00 |
| 3 | POVAL217 | 21.53 |
| 4 | sodium chloride | 6.15 |

The DENIMFLEX Intermediate was prepared using the following process (stage 1):

Step 1: placing water into the first vessel and heating to 75° C.;

Step 2: placing components 2–4 into the first vessel in the order listed;

Step 3: mixing the components at a speed of 100 rpm;

Step 4: once the temperature reached 75° C., holding the mixture in the first vessel for about 5 minutes; and Step 5: placing the resulting composition (i.e., the DENIMFLEX Intermediate) into the second vessel for further processing.

The DENIMFLEX warp sizing composition had the following formulation as shown in Table 5 below.

TABLE 5

DENIMFLEX Warp Sizing Composition Formulation

| Component | Product Name | Parts By Weight (pbw) |
|---|---|---|
| 1 | DENIMFLEX Intermediate | 67.70 |
| 2 | water | 21.35 |
| 3 | carbonyl diamide | 6.77 |
| 4 | SUPERLUBE L-22 M (from Example 1) | 4.08 |
| 5 | BIT-20 | 0.10 |

The DENIMFLEX warp sizing composition was prepared using the following process (stage 2):

Step 1: placing component 2 (water) into the second vessel that contains the DENIMFLEX Intermediate;

Step 2: mixing the components in the second vessel at a speed of 40 to 60 rpm for a sufficient time until the liquor level rises above the impeller;

Step 3: mixing the components in the second vessel at an increased speed of 150 to 300 rpm for about 10 minutes;

Step 4: adding components 3 and 4 into the second vessel and mixing for about 1 hour or until the temperature reaches 35° C. or less;

Step 5: placing component 5 into the second vessel; and

Step 6: mixing all the components in the second vessel for about 10 minutes or until thoroughly mixed to produce the DENIMFLEX warp sizing composition.

The DENIMFLEX warp sizing composition was sampled for quality assurance.

Example 4

Preparation of a Warp Sizing Composition and Sized Warp

The DENIMFLEX warp sizing composition of Example 3 was applied to a warp of blended cotton/polyester yarns in an amount of 14 pbw based on a total weight of the warp yarns.

While the specification has been described in detail with respect to specific embodiments thereof, it will be appreciated that those skilled in the art, upon attaining an understanding of the foregoing, may readily conceive of alterations to, variations of, and equivalents to these embodiments. Accordingly, the scope of the present invention should be assessed as that of the appended claims and any equivalents thereto.

What is claimed is:

1. A method of reclaiming warp sizing components, said method comprising:

desizing a woven fabric to produce a liquor, wherein the woven fabric prior to desizing comprises fibrous material at least partially coated with a warp sizing composition containing:

an original amount of at least one film-forming agent and a nonionic surfactant system comprising an original amount of at least one polyoxyethylated laurate surfactant and an original amount of at least one polyoxyethylated castor oil surfactant;

processing the liquor to separate one or more warp sizing components from other warp sizing components;

wherein the one or more warp sizing components comprise:

(a) at least 50 percent by weight of the original amount of the at least one polyoxyethylated laurate surfactant, based on a total weight of the original amount of the at least one polyoxyethylated laurate surfactant;

(b) at least 50 percent by weight of the original amount of the at least one polyoxyethylated castor oil surfactant, based on a total weight of the original amount of the at least one polyoxyethylated castor oil surfactant; and (c) at least 50 percent by weight of the original amount of the at least one film-forming agent, based on a total weight of the original amount of the at least one film-forming agent.

2. The method of claim 1, wherein the at least one polyoxyethylated laurate surfactant comprises polyoxyethylated (9) laurate, and the at least one polyoxyethylated castor oil comprises polyoxyethylated (40) castor oil.

3. The method of claim 1, wherein the at least one polyoxyethylated laurate surfactant comprises polyoxyethylated (9) laurate, the at least one polyoxyethylated castor oil comprises polyoxyethylated (40) castor oil, and the at least one film-forming agent comprises polyvinyl alcohol.

4. The method of claim 1, wherein the woven fabric comprises a plurality of yarns, wherein each yarn comprises one or more natural or synthetic fibers.

5. The method of claim 4, wherein each yarn comprises cotton, polyester, viscose, rayon, wool, nylon and blends of any of these fibers.

6. The method of claim 4, wherein each yarn comprises cotton or a cotton/polyester blend.

7. The method of claim 1, wherein the one or more warp sizing components comprise:

(a) at least 60 percent by weight of the original amount of the at least one polyoxyethylated laurate surfactant, based on a total weight of the original amount of the at least one polyoxyethylated laurate surfactant;

(b) at least 60 percent by weight of the original amount of the at least one polyoxyethylated castor oil surfactant, based on a total weight of the original amount of the at least one polyoxyethylated castor oil surfactant; and (c) at least 60 percent by weight of the original amount of the at least one film-forming agent, based on a total weight of the original amount of the at least one film-forming agent.

8. The method of claim 1, wherein the one or more warp sizing components comprise:

(a) at least 90 percent by weight of the original amount of the at least one polyoxyethylated laurate surfactant, based on a total weight of the original amount of the at least one polyoxyethylated laurate surfactant;

(b) at least 90 percent by weight of the original amount of the at least one polyoxyethylated castor oil surfactant, based on a total weight of the original amount of the at least one polyoxyethylated castor oil surfactant; and (c) at least 90 percent by weight of the original amount of the at least one film-forming agent, based on a total weight of the original amount of the at least one film-forming agent.

9. The method of claim 1, wherein the processing step comprises an ultra filtration process.

10. The method of recycling one or more warp sizing components of a warp sizing composition, wherein the method comprises:

incorporating the one or more warp sizing components reclaimed by the method of claim 1 into a new warp sizing composition.

11. The method of claim 10, wherein the at least one polyoxyethylated laurate surfactant comprises polyoxyethylated (9) laurate, the at least one polyoxyethylated castor oil comprises polyoxyethylated (40) castor oil, and the at least one film-forming agent comprises polyvinyl alcohol.

12. A method of sizing a warp, said method comprising:

applying a recycled warp sizing composition to a warp, wherein the recycled warp sizing composition comprises:

at least one film-forming agent and a nonionic surfactant system comprising at least one polyoxyethylated laurate surfactant and at least one polyoxyethylated castor oil surfactant.

13. The method of claim 12, wherein the at least one polyoxyethylated laurate surfactant comprises polyoxyethylated (9) laurate, the at least one polyoxyethylated castor oil comprises polyoxyethylated (40) castor oil, and the at least one film-forming agent comprises polyvinyl alcohol.

14. A sized warp resulting from the method of claim 12.

15. A method of sizing a warp, said method comprising:

applying a warp sizing composition to a warp, wherein the warp sizing composition comprises:

at least one film-forming agent and a nonionic surfactant system comprising at least one polyoxyethylated laurate surfactant and at least one polyoxyethylated castor oil surfactant.

16. The method of claim 15, wherein the at least one polyoxyethylated laurate surfactant comprises polyoxyethylated (9) laurate, the at least one polyoxyethylated castor oil comprises polyoxyethylated (40) castor oil, and the at least one film-forming agent comprises polyvinyl alcohol.

17. A sized warp resulting from the method of claim 15.

18. A sized warp resulting from the method of claim 16.

19. The method of claim 15, wherein the warp sizing composition comprises:

greater than about 80 parts by weight (pbw) to about 99 pbw of water;

up to about 5.0 parts by weight (pbw) of a surfactant lubricant composition containing at least one polyoxyethylated laurate surfactant and at least one polyoxyethylated castor oil surfactant; and up to about 20.0 parts by weight (pbw) of at least one film-forming agent;

wherein all parts by weight are based on a total weight of the warp sizing composition.

20. The method of claim 15, further comprising:

forming the warp sizing composition by mixing (i) a dry warp sizing composition containing the at least one polyoxyethylated laurate surfactant and the at least one polyoxyethylated castor oil surfactant and (ii) water.

21. The method of claim 15, wherein the warp comprises a plurality of yarns, wherein each yarn comprises one or more natural or synthetic fibers.

22. The method of claim 21, wherein each yarn comprises cotton, polyester, viscose, rayon, wool, nylon and blends of any of these fibers.

23. The method of claim 21, wherein each yarn comprises cotton or a cotton/polyester blend.

24. A sized warp resulting from the method of claim 23.

* * * * *